(12) United States Patent
Takezawa

(10) Patent No.: US 9,648,196 B2
(45) Date of Patent: May 9, 2017

(54) FACSIMILE APPARATUS, COMMUNICATION METHOD FOR FACSIMILE APPARATUS AND RECORDING MEDIUM

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Fusayoshi Takezawa, Tokyo (JP)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/858,134

(22) Filed: Sep. 18, 2015

(65) Prior Publication Data
US 2017/0085741 A1 Mar. 23, 2017

(51) Int. Cl.
*H04N 1/32* (2006.01)
*H04N 1/00* (2006.01)

(52) U.S. Cl.
CPC ......... *H04N 1/32037* (2013.01); *H04N 1/001* (2013.01); *H04N 1/0001* (2013.01); *H04N 1/00037* (2013.01); *H04N 2201/0093* (2013.01)

(58) Field of Classification Search
CPC ............. H04N 1/0001; H04N 1/00037; H04N 1/00002
USPC ...... 358/1.13, 1.14, 1.15, 405, 412; 709/233
See application file for complete search history.

(56) References Cited

U.S. PATENT DOCUMENTS

| 6,072,599 | A | * | 6/2000 | Oba | H04N 1/00204 358/400 |
| 6,091,807 | A | * | 7/2000 | Yoshida | H04N 1/32619 358/400 |
| 6,826,157 | B1 | * | 11/2004 | Davis | H04L 1/0002 370/252 |

FOREIGN PATENT DOCUMENTS

JP 06-105053 4/1994

* cited by examiner

*Primary Examiner* — Jamares Q Washington
(74) *Attorney, Agent, or Firm* — Amin, Turocy & Watson LLP

(57) ABSTRACT

A facsimile apparatus comprises a communication unit having a high-speed communication mode and a low-speed communication mode lower in communication speed than the high-speed communication mode. The facsimile apparatus automatically selects the low-speed communication mode to send a fax to an opposite communication party the communication error occurrence of which meets a specific condition in the case where a fax is sent in the high-speed communication mode.

10 Claims, 7 Drawing Sheets

FIG.4

| OPPOSITE COMMUNICATION PARTY PA ||| 
|---|---|---|
| COMMUNICATION START TIME | COMMUNICATION MODE | COMMUNICATION RESULT |
| 2015-1-15 09:01:32 | HIGH-SPEED COMMUNICATION MODE | FALSE END |
| 2015-1-15 09:08:25 | HIGH-SPEED COMMUNICATION MODE | FALSE END |
| 2015-1-15 09:15:45 | HIGH-SPEED COMMUNICATION MODE | FALSE END |
| 2015-1-15 09:20:03 | LOW-SPEED COMMUNICATION MODE | NORMAL END |
| 2015-1-15 10:48:50 | LOW-SPEED COMMUNICATION MODE | NORMAL END |
| 2015-1-15 11:32:43 | LOW-SPEED COMMUNICATION MODE | NORMAL END |
| ... | ... | ... |
| ... | ... | ... |

FIG.5

| OPPOSITE COMMUNICATION PARTY PB |||
| --- | --- | --- |
| COMMUNICATION START TIME | COMMUNICATION MODE | COMMUNICATION RESULT |
| 2015-1-15 09:48:26 | HIGH-SPEED COMMUNICATION MODE | NORMAL END |
| 2015-1-15 10:15:25 | HIGH-SPEED COMMUNICATION MODE | NORMAL END |
| 2015-1-15 13:18:25 | HIGH-SPEED COMMUNICATION MODE | NORMAL END |
| 2015-1-16 09:43:03 | HIGH-SPEED COMMUNICATION MODE | NORMAL END |
| 2015-1-16 13:47:28 | HIGH-SPEED COMMUNICATION MODE | NORMAL END |
| 2015-1-17 16:28:37 | HIGH-SPEED COMMUNICATION MODE | NORMAL END |
| ... | ... | ... |
| ... | ... | ... |

FIG.6

| OPPOSITE COMMUNICATION PARTY PB ||| |
|---|---|---|
| COMMUNICATION START TIME | COMMUNICATION MODE | COMMUNICATION RESULT |
| 2015-1-29 16:28:48 | HIGH-SPEED COMMUNICATION MODE | NORMAL END |
| 2015-1-29 13:37:57 | HIGH-SPEED COMMUNICATION MODE | FALSE END |
| 2015-1-29 13:42:23 | HIGH-SPEED COMMUNICATION MODE | FALSE END |
| 2015-1-29 13:47:03 | HIGH-SPEED COMMUNICATION MODE | NORMAL END |
| 2015-1-30 10:48:50 | HIGH-SPEED COMMUNICATION MODE | FALSE END |
| 2015-1-30 16:32:43 | LOW-SPEED COMMUNICATION MODE | NORMAL END |
| 2015-1-30 16:36:22 | LOW-SPEED COMMUNICATION MODE | NORMAL END |
| ... | ... | ... |
| ... | ... | ... |

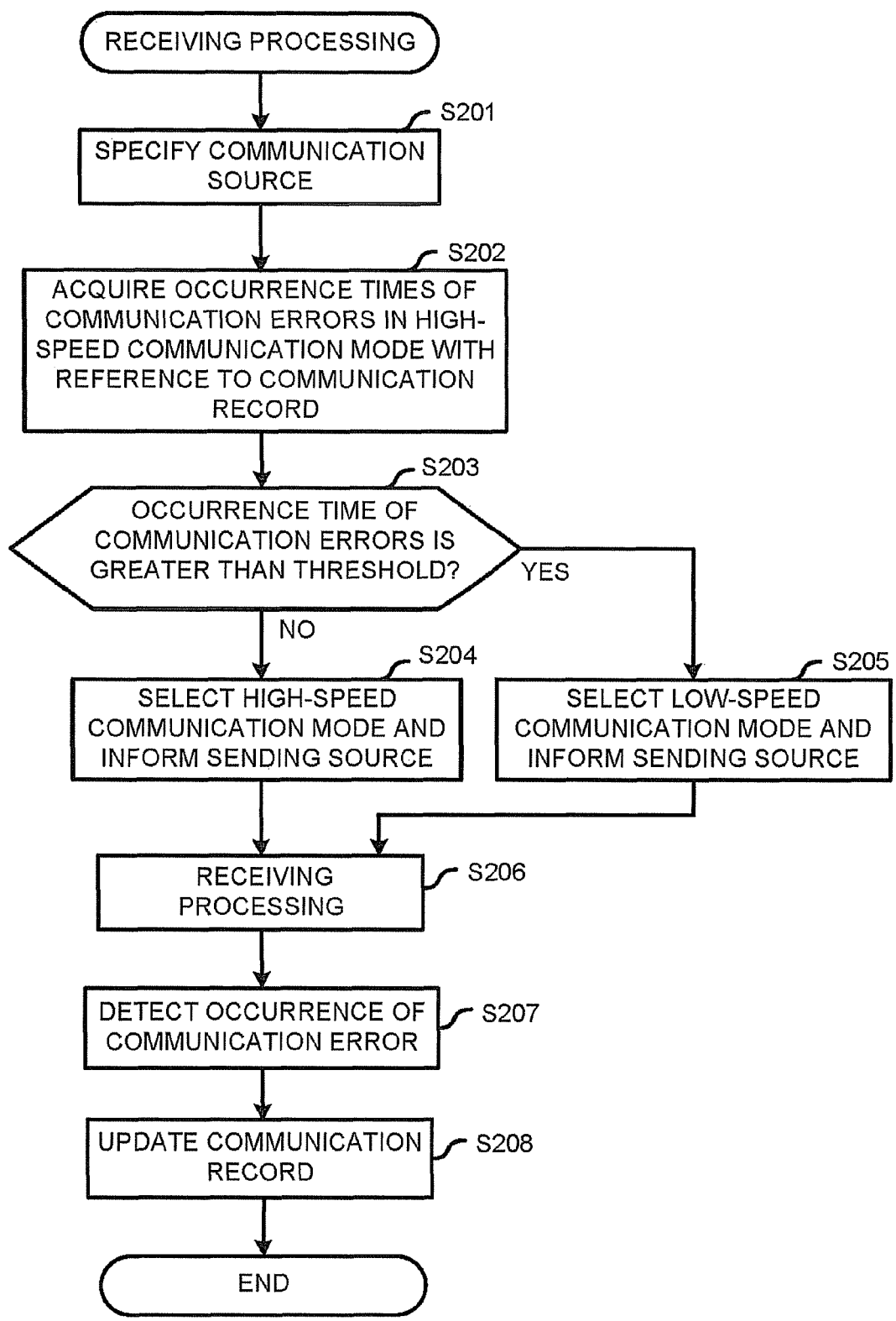

FACSIMILE APPARATUS, COMMUNICATION METHOD FOR FACSIMILE APPARATUS AND RECORDING MEDIUM

FIELD

The present invention relates to a facsimile apparatus, a communication method for a facsimile apparatus and a recording medium.

BACKGROUND

Generally, a facsimile apparatus carries a modem capable of realizing high-speed communication over a telephone line in accordance with the ITU-T (International Telecommunication Union Telecommunication Standardization Sector) Recommendation V.34 standard. When a fax is sent by the facsimile apparatus in accordance with the V.34 standard, a sending error such as packet loss may occur in some cases if the telephone line of the receiver is an optical line or IP telephone line.

The sending error can be prevented in the following way: for a receiver to which the sending of a fax confronts a sending error, the user manually switches to a sending mode of a lower communication speed.

However, this approach has the problem that it is time-consuming to switch between sending modes manually.

Thus, a technology is desired by means of which a fax can be sent in a proper communication mode in a time-saving manner.

DESCRIPTION OF THE DRAWINGS

FIG. 4 is a diagram illustrating a first example of a communication record according to an embodiment;

FIG. 5 is a diagram illustrating a second example of a communication record according to an embodiment;

FIG. 6 is a diagram illustrating a second example of a communication record according to an embodiment; and FIG. 7 is a flowchart illustrating the flow of a receiving processing according to a variation of an embodiment.

DETAILED DESCRIPTION

A facsimile apparatus involved in an embodiment comprises: a communication unit having a high-speed communication mode and a low-speed communication mode; a communication error detection unit configured to detect a communication error; a determination unit configured to store a communication record containing the communication error detected by the communication error detection unit and an opposite communication party and determine whether or not the communication errors occurring during the communication with the facsimile apparatus of the opposite communication party meet a specific condition based on the communication record; and a communication mode selection unit configured to select the low-speed communication mode as the communication speed of the communication unit when the facsimile apparatus communicates with an opposite communication party which is determined by the determination unit as meeting the specific condition.

An embodiment of the present invention is described below in detail with reference to accompanying drawings.

A facsimile apparatus 1 involved in an embodiment of the present invention automatically selects a low-speed communication mode to send a fax to an opposite communication party if communication errors occur during the process of sending a fax to the opposite communication party in the high-speed communication mode.

Figure 1:
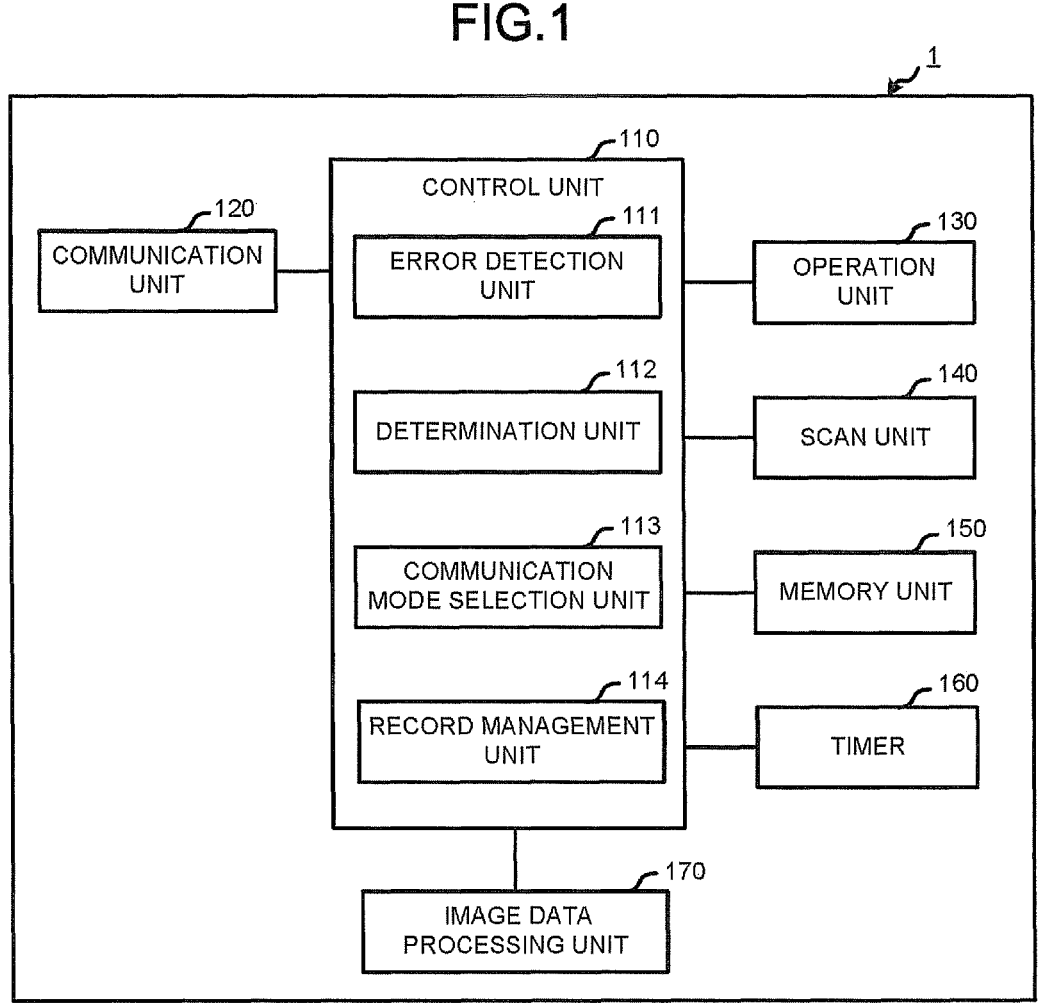
FIG. 1 is a block diagram illustrating the structure of a facsimile apparatus according to an embodiment.

As shown in FIG. 1, the facsimile apparatus 1 comprises a control unit 110, a communication unit 120, an operation unit 130, a scan unit 140, a memory unit 150, a timer 160 and an image data processing unit 170.

Figure 2:
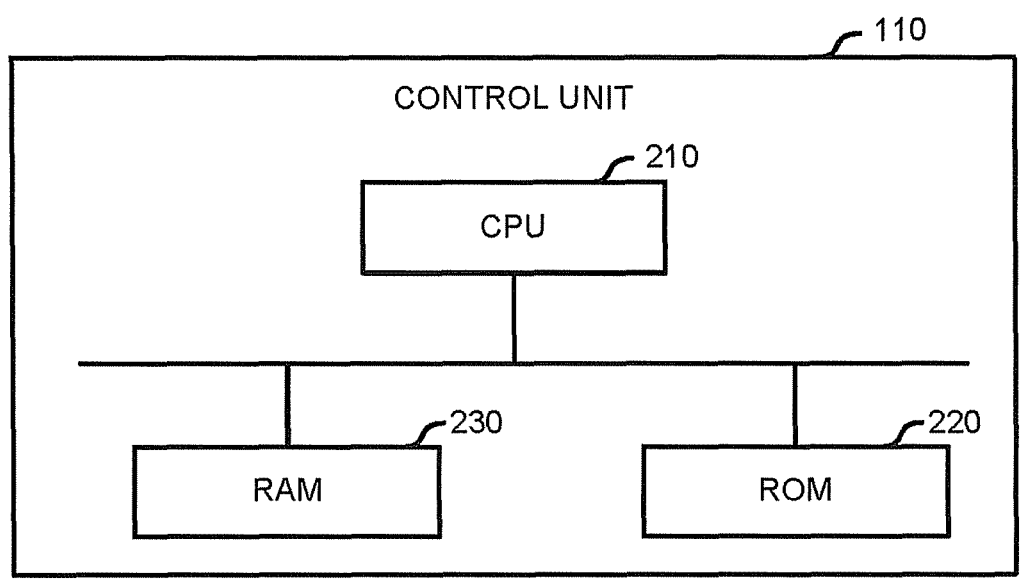
FIG. 2 is a block diagram illustrating the structure of the control unit of a facsimile apparatus according to an embodiment.

As shown in FIG. 2, the control unit 110 which is composed of a Central Processing Unit (CPU) 210, a Read Only Memory (ROM) 220 and a Random Access Memory (RAM) 230 controls the whole facsimile apparatus 1. Specifically, the CPU 210 uses the RAM 230 as a work area and controls the whole facsimile apparatus 1 by executing a control program stored in the ROM 220.

With the foregoing structure, the control unit 110 functions as an error detection unit 111, a determination unit 112, a communication mode selection unit 113 and a record management unit 114, as shown in FIG. 1.

The error detection unit 111 detects a communication error occurring in the communication of a fax (outgoing call) sent from the communication unit 120. The communication error includes a situation that communication is unachievable while telephone lines are connected and a situation that the communication with the receiver is started and then interrupted. The communication error excludes a situation that communication is unachievable because the telephone line of the receiver is busy.

The determination unit 112 determines whether or not the times communication errors occur during the communication with each opposite communication party is greater than a threshold with reference to the communication record recorded in the memory unit 150.

The communication mode selection unit 113 selects the communication mode of the facsimile apparatus according to the determination result of the determination unit 112.

Specifically, the communication mode selection unit 113 selects a high-speed communication mode if the determination unit 112 determines that the times communication errors occur is not greater than the threshold or a low-speed communication mode if the determination unit 112 determines that the times communication errors occur is greater than the threshold.

The record management unit 114 stores a communication record containing information such as a sending time and a communication mode and the communication error detected by the error detection unit 111 in the memory unit 150. A communication result is recorded as 'normal end' if no communication error occurs or 'false end' if communication errors occur.

The communication unit 120 implements the communication of a fax, in the high-speed communication mode or a low-speed communication mode lower in communication speed than the high-speed communication mode. For example, the high-speed communication mode is a mode in which communication is implemented in accordance with the ITU-T recommendation V.34 standard, and the low-speed communication mode is a mode in which communication is implemented in accordance with the ITU-T recommendation V.17 standard.

The operation unit 130 equipped with various buttons and a touch panel outputs a signal to the control unit 110 corresponding to an operation of the user.

The scan unit 140 decomposes two-dimensional information of a sent object, that is, an original, into lines or points and scans the lines or points.

The memory unit 150 consisting of, for example, a flash memory, temporarily stores information of the original document scanned by the scan unit 140 and stores various data including the communication record.

The timer 160 is a real-time clock for recording the current time.

The image data processing unit 170 carries out a signal processing such as compression or modulation so as to send the read information of the original.

Next, the sending processing carried out by the facsimile apparatus 1 is described. To send a fax, the user carries out the following operations: place an original in the facsimile apparatus 1, specify a transmission destination and instruct the facsimile apparatus 1 to start to send a fax. The facsimile apparatus 1 carries out the sending processing shown in the flowchart of FIG. 3 in response to the operations.

Figure 3:
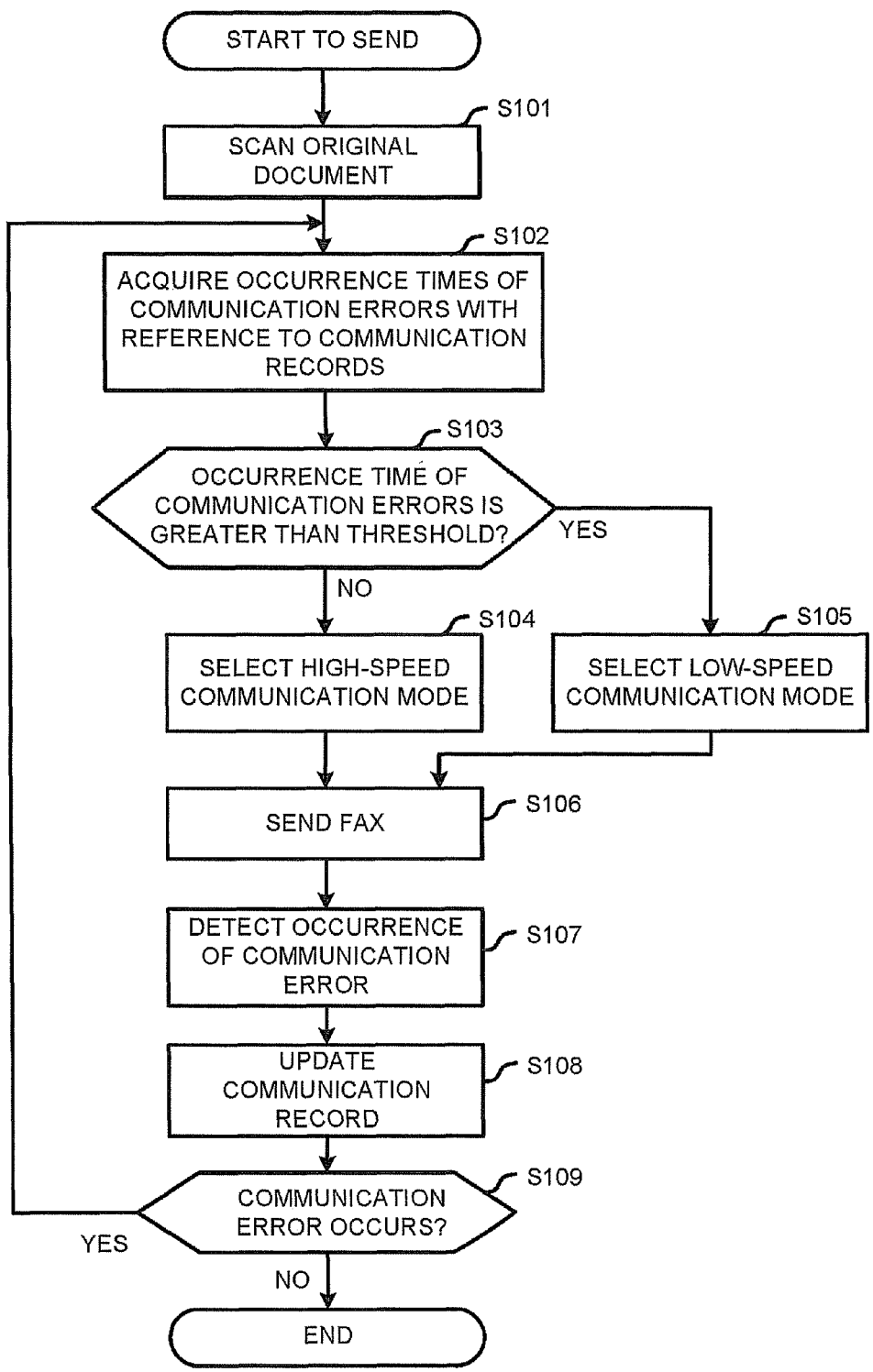
FIG. 3 is a flowchart illustrating the flow of a sending processing according to an embodiment.

During the sending processing, first, the scan unit 140 scans an original placed in the facsimile apparatus 1 (S101), as shown in FIG. 3. Information of the read original is stored in the memory unit 150.

Next, the determination unit 112 acquires the occurrence times of the communication errors occurring during the communication with the facsimile apparatus of a user-specified communication party with reference to the communication records recorded in the memory unit 150 of the communication party (S102).

Then, the determination unit 112 determines whether or not the times communication errors occur meets a specific condition. Specifically, the determination unit 112 determines whether or not the times communication errors occur is greater than a threshold (S103). If the times communication errors occur is not greater than the threshold (S103: No), then the communication mode selection unit 113 selects the high-speed communication mode (S104). If the times communication errors occur is greater than the threshold (S103: Yes), then the communication mode selection unit 113 selects the low-speed communication mode (S105).

Sequentially, the communication unit 120 sends a fax in the communication mode selected by the communication mode selection unit 113 (S106). Specifically, the image data processing unit 170 carries out a signal processing such as compression or modulation for the image data which is stored in the memory unit 150 as an object to be sent, and the communication unit 120 sends the processed image data.

The error detection unit 111 detects whether or not a communication error occurs during the process of sending the fax (S107). Next, the record management unit 114 updates a communication record stored in the memory unit 150 (S108) Specifically, as shown in FIG. 4-FIG. 6, the record management unit 114 records, for each opposite communication party, a communication record containing a communication start time, a communication mode and a communication result (succeeded sending or failed sending) and adds the current communication information in the communication record. Further, the communication start time which refers to the time at which the communication unit 120 starts to send a fax in Act 106 is recorded by the timer 160. Further, the record management unit 114 records the column 'communication mode' as 'high-speed communication mode' if the fax is sent in the high-speed communication mode or as 'low-speed communication mode' if the fax is sent in the low-speed communication mode. The record management unit 114 records the column 'communication result' as 'normal end' if no communication error occurs or as 'false end' if communication errors occur.

Then, the determination unit 112 determines whether or not a communication error is detected by the error detection unit 111 in Act S107 (S109). If no communication error is detected by the error detection unit 111 (S109: No), then the sending processing is ended. If a communication error is detected by the error detection unit 111 (S109: Yes), the flow returns to Act S102 to carry out the subsequent processing again.

As stated above, the facsimile apparatus 1 is capable of sending, in a high-speed communication mode, a fax to an opposite communication party to which a fax can be sent in a high-speed communication mode and automatically selecting a relatively stable low-speed communication mode to send a fax to an opposite communication party to which the sending of a fax confronts sending errors repeatedly.

Thus, the facsimile apparatus 1 is capable of achieving a stable fax communication with another facsimile apparatus.

Next, the sending processing carried out by the facsimile apparatus 1 is described based on a specific example. Further, the threshold used in Act S103 for determining the times communication errors occur is set to be 3.

The sending of a fax from the facsimile apparatus 1 to an opposite communication party PA is described first. It is assumed that the facsimile apparatus 1 sends a fax to the opposite communication party PA for the first time and the telephone line of the opposite communication party PA is an IP telephone line.

The user carries out the following operations: specify the destination to which the fax is sent to be the PA and instruct the facsimile apparatus to start the processing. The scan unit 140 scans an original document in response to the operation (S101). Next, the determination unit 112 refers to a communication record (S102). Because the facsimile apparatus 1 sends a fax to the opposite communication party PA for the first time, the communication error occurrence times recorded in the communication record on the communication errors occurring during the communication with the opposite communication party PA is 0.

The determination unit 112 determines whether or not the communication error occurrence times is greater than the threshold (S103). As the times the communication errors occur during the communication with the opposite communication party PA is 0, the determination unit 112 determines that the communication error occurrence time is not greater than the threshold (S103: No), the communication mode selection unit 113 selects the high-speed communication mode (S104).

The communication unit 120 sends the read data to the opposite communication party PA in the high-speed communication mode (S106). Because the telephone line of the opposite communication party PA is an IP telephone line, a communication error occurs. The error detection unit 111 detects the occurrence of the communication error (S107). As shown in FIG. 4, the record management unit 114 updates the communication record to be 'communication start time: 2015-1-15 09:01:32'; communication mode: high-speed communication mode; communication result: false end' (S108).

Then, the determination unit 112 determines whether or not a communication error occurs (S109). The sending processing returns to Act S102 as a communication error is detected in Act S107.

Next, the determination unit 112 refers to the communication record (S102). As the communication error occurrence times recorded in the communication record by the communication record management unit 114 on the times communication errors occur during the communication with the opposite communication party PA is 1, not higher than 3 (S103: No), the high-speed communication mode is selected (S104).

The communication unit 120 sends the data to the opposite communication party PA in the high-speed communication mode (S106). Because the telephone line of the opposite communication party PA is an IP telephone line, a communication error occurs. The communication error is detected by the error detection unit 111 (S107). As shown in FIG. 4, the record management unit 114 adds the following information in the communication record: communication start time: 2015-1-15 09:08:25; communication mode: high-speed communication mode; communication result: 'false end' (S108).

As the communication error occurs, the processing returns to Act S102 shown in FIG. 3 (S109: Yes) to continue the processing.

As the error occurrence times recorded in the communication record is '2', a communication error occurs again when the data is sent in the high-speed communication mode. As shown in FIG. 4, the record management unit 114 updates the communication record as 'communication start time: 2015-1-15 09:15:45'; communication result: false end' (S108).

As the communication error occurs, the processing returns to Act S102. Next, as the communication error occurrence times recorded in the communication record on the communication errors occurring during the communication with the opposite communication party PA is equal to the threshold '3' (S103: Yes), then the communication mode selection unit 113 selects the low-speed communication mode (S105).

The communication unit 120 sends fax data in the low-speed communication mode (S106). No communication error occurs in the low-speed communication mode unless there is a specific reason. Thus, no communication error is detected by the error detection unit 111 (it is assumed like this again). As shown in FIG. 4, the record management unit 114 updates the communication record as 'communication start time: 2015-1-15 09:20:03'; communication result: 'normal end' (S108).

When the facsimile apparatus 1 sends a fax to the opposite communication party PA later, as the communication error occurrence times recorded in the communication record on the times communication errors occurring during the communication with the opposite communication party PA is greater than 3, the facsimile apparatus 1 sends data in the low-speed communication mode.

The sending of a fax from the facsimile apparatus 1 to an opposite communication party PB through an ordinary telephone line (not IP telephone line or the like) is described below.

First, it is assumed here that the facsimile apparatus 1 sends a fax to the opposite communication party PB for the first time. In this case, the times communication errors occur during the communication with the opposite communication party PB is '0'. Thus, the communication error occurrence times is determined to be below the threshold (S103: No) and the high-speed communication mode is selected (S104), the fax is sent to the opposite communication party PB in the high-speed communication mode (S106).

Because the telephone line of the opposite communication party PB is an ordinary telephone line, no communication error occurs (it is assumed like this here). No communication error is detected by the error detection unit 111, and the record management unit 114 records 'normal end' in the communication record (S108). As shown in FIG. 5, the communication record is the record presented in the column started with 'communication start time: 2015-1-15 09:48:26'. The sending processing is ended as no communication error occurs (S109: No)

As no communication error occurs when the fax is sent from the facsimile apparatus 1 to the opposite communication party PB, the high-speed communication mode is still selected, and as recorded in the communication record shown in FIG. 5, the fax is sent normally in the high-speed communication mode.

Below is description on a case where communication errors occasionally occur during the process that the facsimile apparatus 1 sends a fax to the opposite communication party PB.

As described with reference to FIG. 5, in normal case, the facsimile apparatus 1 selects the high-speed communication mode for the communication with the opposite communication party PB (Act S103: No, Act S104).

Here, as presented in the communication record shown in FIG. 6, it is assumed that communication errors occur for two successive times in the high-speed communication mode for some reasons after a fax is sent in the high-speed communication mode.

In this stage, as the communication error occurrence times is '2', smaller than the threshold '3' (Act S103: No), the high-speed communication mode is selected for the next communication with a facsimile apparatus. In this way, even if communication errors occur occasionally, the high-speed communication mode is selected for the next communication with a facsimile apparatus as long as the communication error occurrence times is smaller than the threshold.

As shown in FIG. 6, if the current communication with facsimile apparatus is ended normally, then the high-speed communication mode is selected for the next communication with a facsimile apparatus.

It is assumed here that communication errors occur occasionally in the next communication. In this case, the communication error occurrence times is '3', reaching the threshold. Thus, the low-speed communication mode is selected for the next sending of the fax because the result of the determination of Act S103 is 'Yes'.

Thus, the low-speed communication mode is selected automatically in the case where communication errors occur frequently because of some reasons even the communication line of the opposite communication party is an ordinary telephone line.

Variation of Embodiment

Not limited to the foregoing embodiments, the present invention may have various variations which are devised without departing from the scope of the present invention.

The foregoing example is described in which the facsimile apparatus 1 sets, when sending a fax, the communication mode to the low-speed communication mode according to the occurrence condition of sending errors. The present invention is not limited to this. The facsimile apparatus 1 may set, when receiving a fax, a communication mode according to the occurrence condition of communication errors occurring during the past communication with a facsimile apparatus.

The actions implemented by the facsimile apparatus 1 in this case are described below.

First, if information is received by the facsimile apparatus 1 from another facsimile apparatus, then the control unit 110 starts the receiving processing shown in FIG. 7 in a negotiation stage.

First, the control unit 110 specifies a communication source (a fax sending source) (Act S201).

Then, the determination unit 112 determines, with reference to the communication record, the times communication errors occur during the fax communication with the sending source specified in Act S201 in the high-speed communication mode (Act S202).

Sequentially, the determination unit 112 determines whether or not the communication error occurrence times is greater than a threshold (S203).

If the communication error occurrence times is determined to be smaller than the threshold (S203: No), then the communication mode selection unit 113 selects the high-speed communication mode and informs the facsimile apparatus of the sending source of the high-speed communication mode (S204). If the communication error occurrence times is determined to be greater than the threshold (S203: Yes), then the communication mode selection unit 113 selects the low-speed communication mode and informs the facsimile apparatus of the sending source of the low-speed communication mode (S205).

Then, data is received at the communication speed specified in the negotiation (S206).

If the communication of the facsimile apparatuses is ended, then whether or not communication errors occur is detected (S207). The record management unit 114 updates the communication record (S208). Then, the control unit 110 ends the current processing.

The facsimile apparatus 1 may carry out the sending processing shown in FIG. 3 and the receiving processing shown in FIG. 7 separately.

Further, the communication record may be divided into a sending record and a receiving record. In this case, when the facsimile apparatus 1 sends a fax, the control unit 110 refers to the sending record in Act S102 and updates the sending record in Act S108. On the other hand, when the facsimile apparatus 1 receives a fax, the control unit 110 refers to the receiving record in Act S202 and updates the receiving record in Act S208.

Further, the threshold, although set to be 3 in the foregoing description, may be set to be any value. Moreover, the threshold may be a variable value. The user can input an optional value from the operation unit 130 as the threshold.

Moreover, it is exemplified in the foregoing description that a specific condition for the selection of a low-speed communication mode is determined to be met and the low-speed communication mode is selected when communication error occurrence times is more than a threshold. The specific condition is not limited to this. For example, the determination unit 112 determines that communication errors meet a specific condition when a communication error occurrence rate is higher than a specific value. Specifically, if the value obtained by dividing the times communication errors occur by the total communication times is higher than a specific value, then communication errors meet a specific condition. No specific limitations are given to the value higher than a specific value as long as the value is below 1, for example, the value higher than a specific value may be 0.5. Further, the value higher than a specific value may be any value input by the user from the operation unit 130.

Further, in the foregoing description, the number (total number) of communication errors is counted up in Act S102 or S202, regardless of the communication mode, and whether or not a specific condition is met is determined in Act S103 or S203. As an alternative, the control unit 110 counts up the number (total number) of the communication errors occurring in the high-speed communication mode in Act S102 or S202 and determines whether or not a specific condition is met in Act S103 or S203 so that the low-speed communication mode can be selected automatically without being affected by a communication error caused for an occasional reason.

The facsimile apparatus 1 may further determine whether or not the communication errors occurring within a specific period of time meet a specific condition. The specific period of time, which is not specifically limited, may be, for example, the last week, the last month or the last year. The specific period of time may be any value input by the user from the operation unit 130. Even if capable of sending a fax to the opposite communication party in the high-speed communication mode, the facsimile apparatus 1 selects the low-speed communication mode when occasional communication errors totally occur more than a threshold times. With reference to the communication record recorded for the specific period of time, the low-speed communication mode may not be selected when occasional communication errors totally occur more than a threshold times.

Not limited to the foregoing examples, the specific condition can be optionally set, for example, the specific condition may be 'communication errors successively occur time and time again in high-speed communication mode', 'the total number of communication errors is greater than N and the communication error occurrence rate is above M % in the high-speed communication mode' or the like.

Further, it is described in the foregoing embodiments that a high-speed communication mode refers to a mode in which communication is carried out in accordance with the ITU-T recommendation V.34 standard and a low-speed communication mode refers to a mode in which communication is carried out in accordance with the V.17 standard, however, the communication standards may be any communication standards in accordance with which a fax can be sent, but not limited to any specific ones.

A facsimile apparatus having a high-speed communication mode and a low-speed communication mode is exemplified in the foregoing embodiments. The facsimile apparatus 1 may have more than three communication modes.

As an example, the facsimile apparatus 1 further has an intermediate-speed communication mode which is lower than the high-speed communication mode but higher than the low-speed communication mode in communication speed.

In this case, the communication mode selection unit 113 selects the intermediate-speed communication mode after it is determined that the communication errors occurring in the communication implemented in the high-speed communication mode meet a first specific condition. Further, the communication mode selection unit 113 selects the low-speed communication mode after it is determined that the communication errors occurring in the communication implemented in the intermediate-speed communication mode meet a second specific condition.

In order to make the present invention understood better, the generation of a communication record for each opposite communication party is exemplified above, however, a communication log may be used as the communication record, in this case, the communication log is retrieved in Act S102 or S202 to obtain the communication condition of the communication with the other communication party.

Further, an action program for regulating the actions of the facsimile apparatus 1 involved in the foregoing embodiments may be stored in a personal computer or an information terminal machine so that the personal computer or information terminal machine can function as the facsimile apparatus 1 involved in the present invention.

Such a program can be distributed in an optional way, for example, such a program can be stored in a computer-readable recording medium such as a CD-ROM (Compact Disk Read-Only Memory), a DVD (Digital Versatile Disk, an MOD (Magneto Optical Disk) or a memory card and then distributed or distributed via a communication network such as the Internet While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A facsimile apparatus, comprising:
   a communicator that has a high-speed communication mode and a low-speed communication mode lower in communication speed than the high-speed communication mode;
   a communication error detector that detects a communication error;
   a record manager that manages to store a communication record containing the communication error detected by the communication error detector and an opposite communication party in a non-transitory memory;
   a determiner that determines whether or not the communication errors occurring during the communication with the facsimile apparatus of the opposite communication party meet a specific condition based on the communication record; and
   a communication mode selector that selects the low-speed communication mode as the communication speed of the communicator when the facsimile apparatus communicates with an opposite communication party which is determined by the determiner as meeting the specific condition,
   wherein the record manager manages to store a date of a communication that is implemented in the communication record in the non-transitory memory, and
   the determiner determines whether or not the communication errors occurring within a specific period of time meet a specific condition based on the date of the communication.

2. The facsimile apparatus according to claim 1, wherein the communication error detector detects the communication errors occurring in the communication implemented in the high-speed communication mode.

3. The facsimile apparatus according to claim 2, wherein the determiner determines that the specific condition is met if the communication errors occur more than a threshold times.

4. The facsimile apparatus according to claim 2, wherein the record manager manages to store the communication records of communication results without communication error and with a communication error; and
   the determiner determines that the specific condition is met when the occurrence rate of the communication errors is above a specific rate obtained by dividing times communication errors occur by total communication times.

5. The facsimile apparatus according to claim 3, wherein the determiner determines that the specific condition is met when the communication errors occur more than a threshold times within the specific period.

6. The facsimile apparatus according to claim 3, comprising:
   an operator that receives the input threshold.

7. The facsimile apparatus according to claim 4, further comprising:
   an operator that receives the input specific rate.

8. The facsimile apparatus according to claim 5, further comprising:
   an operator that receives the input specific period of time.

9. A communication method for a facsimile apparatus, comprising:
   a communication error detection step of detecting a communication error occurring during the communication of facsimile apparatuses;
   a record management step of storing a communication record containing the communication errors in a non-transitory memory;
   a determination step of determining whether or not the communication errors occurring during the communication with the facsimile apparatus of the opposite communication party meet a specific condition based on the communication record; and
   a step of selecting a low-speed communication mode lower in communication speed than a high-speed communication mode if the communication errors determined to meet the specific condition in the determination step and carrying out communication of facsimile apparatuses,
   wherein, in the record management step, a date of a communication that is implemented in the communication record is stored in the non-transitory memory; and
   in the determination step, whether or not the communication errors occurring within a specific period of time meet a specific condition is determined based on the date of the communication.

10. A non-transitory recording medium for causing a computer to function as:
    a communicator that has a high-speed communication mode and a low-speed communication mode lower in communication speed than the high-speed communication mode;
    a communication error detector that detects a communication error;
    a record manager that manages to store a communication record containing the communication error detected by the communication detector and an opposite communication party in a non-transitory memory;
    a determiner that determines whether or not the communication errors occurring during the communication with the facsimile apparatus of the opposite communication party meets a specific condition based on the communication record; and a communication mode selector that selects the low-speed communication mode as the communication speed of the communicator when the facsimile apparatus communicates with an opposite communication party which is determined by the determiner as meeting the specific condition, wherein the record manager manages to store a date of a communication that is implemented in the communication record in the non-transitory memory, and the determiner determines whether or not the communication errors occurring within a specific period of time meet a specific condition based on the date of the communication.

* * * * *